(12) United States Patent
Anderson

(10) Patent No.: US 10,344,985 B2
(45) Date of Patent: Jul. 9, 2019

(54) OVEN TIME AND TEMPERATURE DEVICE AND METHOD OF COMPUTING OVEN COOKNG TIME

(71) Applicant: Lawrence E Anderson, Arlington, VA (US)

(72) Inventor: Lawrence E Anderson, Arlington, VA (US)

( * ) Notice: Subject to any disclaimer, the term of this patent is extended or adjusted under 35 U.S.C. 154(b) by 1337 days.

(21) Appl. No.: 13/844,952

(22) Filed: Mar. 16, 2013

(65) Prior Publication Data

US 2014/0278202 A1   Sep. 18, 2014

(51) Int. Cl.
*G01K 13/00* (2006.01)
*F24C 7/08* (2006.01)

(52) U.S. Cl.
CPC .......... *F24C 7/087* (2013.01); *G01K 13/00* (2013.01)

(58) Field of Classification Search
CPC ................ F24C 7/087; G01K 13/00
See application file for complete search history.

(56) References Cited

U.S. PATENT DOCUMENTS

| | | | | |
|---|---|---|---|---|
| 4,405,991 A * | 9/1983 | Stanley | ............... | F24C 7/082 219/704 |
| 4,963,375 A * | 10/1990 | Sato | ............... | A21B 1/40 426/231 |
| 5,140,121 A * | 8/1992 | Pesheck | ............... | A23G 9/48 219/729 |
| 5,726,423 A * | 3/1998 | Westerberg | ............... | A47J 27/62 219/411 |
| 5,827,556 A * | 10/1998 | Maher, Jr. | ............... | A47J 37/1266 426/233 |
| 5,945,018 A * | 8/1999 | Halen | ............... | F24C 7/087 219/486 |
| 5,976,591 A * | 11/1999 | Vieira Da Silva | ............... | A47J 27/10 426/233 |

(Continued)

FOREIGN PATENT DOCUMENTS

WO    WO 2010006230 A2 *   1/2010   ............... F24C 7/08

OTHER PUBLICATIONS

The Fresh Loaf, Lesson Three: Time and Temperature, Jan. 26, 2005, http://www.thefreshloaf.com/lessons/timeandtemperature, pp. 2-6.*

(Continued)

*Primary Examiner* — John E Breene
*Assistant Examiner* — Yaritza H Perez Bermudez

(57) ABSTRACT

A method and device for computing the heat transferred during the period of time the oven takes to reach a predetermined cooking temperature comprising: at least one processor for estimating a first cooking time; a memory; an input for inputting the first cooking time and the amount of time an oven takes to achieve a series of cooking temperatures; the at least one processor operating to estimate the heat transferred to the food during the time period that the oven takes to reach the predetermined cooking temperature; the at least one processor operating to compute the amount of heat transferred to the food per unit time at the predetermined cooking temperature, and the at least one processor operating to calculate a reduced cooking time needed to cook the food based upon insertion of food into the oven at a temperature other than the predetermined cooking temperature.

24 Claims, 6 Drawing Sheets

(56) References Cited

U.S. PATENT DOCUMENTS

| | | | | |
|---|---|---|---|---|
| 6,153,860 A | * | 11/2000 | Weng | G05D 23/1917 |
| | | | | 219/413 |
| 6,229,130 B1 | * | 5/2001 | Furuta | H05B 6/6455 |
| | | | | 219/494 |
| 6,410,066 B1 | * | 6/2002 | Weng | A23L 3/003 |
| | | | | 426/231 |
| 6,777,651 B1 | * | 8/2004 | Boyer | F24C 7/082 |
| | | | | 219/400 |
| 6,812,433 B1 | * | 11/2004 | Barritt | F24C 15/325 |
| | | | | 219/412 |
| 2007/0117058 A1 | * | 5/2007 | Furuti | F24C 3/126 |
| | | | | 431/281 |
| 2009/0173731 A1 | * | 7/2009 | Nagamitsu | H05B 6/062 |
| | | | | 219/622 |
| 2010/0006561 A1 | * | 1/2010 | Hensel | A47J 37/0807 |
| | | | | 219/483 |
| 2012/0091120 A1 | * | 4/2012 | Englert | H05B 1/0263 |
| | | | | 219/486 |

OTHER PUBLICATIONS

EUFIC Review Article "The Why, How and Consequences of Cooking our Food" at http://www.eufic.ord/article/en/expid/cooking-review-eufic/ (downloaded Jan. 19, 2013.).

Time vs. Temperature—What Changes What? at http://cooking.stackexchange.com/questins/11739/time-vs-temperature-what-changes-what (downloaded Jan. 19, 2013.).

"Cooking Fish and Shellfish," http://www.four-h.purdue.edu/food/Cooking%20fish%20fishand%20shellfish%20frame1.htm (downloaded Jan. 19, 2013.).

* cited by examiner

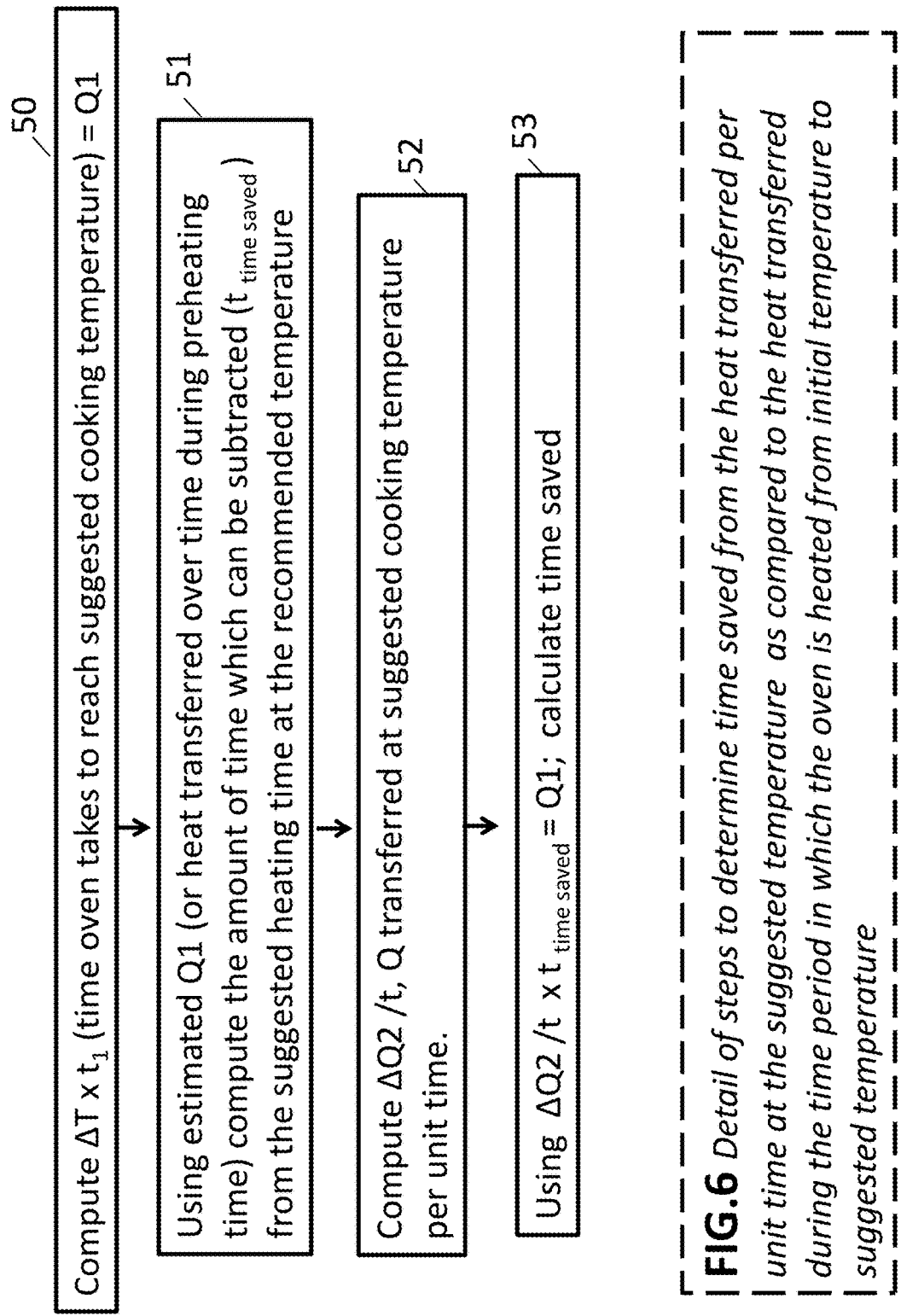
FIG.6 *Detail of steps to determine time saved from the heat transferred per unit time at the suggested temperature as compared to the heat transferred during the time period in which the oven is heated from initial temperature to suggested temperature*

OVEN TIME AND TEMPERATURE DEVICE AND METHOD OF COMPUTING OVEN COOKNG TIME

BACKGROUND

Cooking a frozen or thawed food item or package has essentially become a two step process. The first being warming of the oven to the desired temperature and the second being entering the food into the oven. Since it is impractical to constantly monitor the oven, energy (and time) is lost since the food is not immediately placed into the oven when the cooking temperature is reached. However, the instructions on the food package state that this is the recommended procedure.

SUMMARY OF PRESENT INVENTION

A preferred embodiment of the present invention comprises a system enabling the insertion into an oven of the food to be cooked at or around the time the oven starts heating.

A preferred embodiment comprises a device for capturing and storing cooking information based on the heating ability of an oven and selecting a heating time based upon the actual temperature being sensed in the food item.

A preferred embodiment enables a one-step cooking procedure in which food is placed in the oven at commencement of oven heating and the cooking time is recomputed to reflect concurrent heating.

BRIEF DESCRIPTION OF THE DRAWINGS

These and/or other aspects and advantages of the invention will become apparent and more readily appreciated from the following description of the embodiments, taken in conjunction with the accompanying drawings of which: The drawings of this invention are illustrative and diagrammatic in nature in order to present the principles of the invention. They are being provided as examples without limiting the invention to the specific configuration or dimensions shown.

FIG. 6 is a flow chart of steps to determine time saved from the heat transferred per unit time at the suggested temperature as compared to the heat transferred during the time period in which the oven is heated from initial temperature to suggested temperature

DETAILED DESCRIPTION OF PREFERRED EMBODIMENTS

Figure 1:
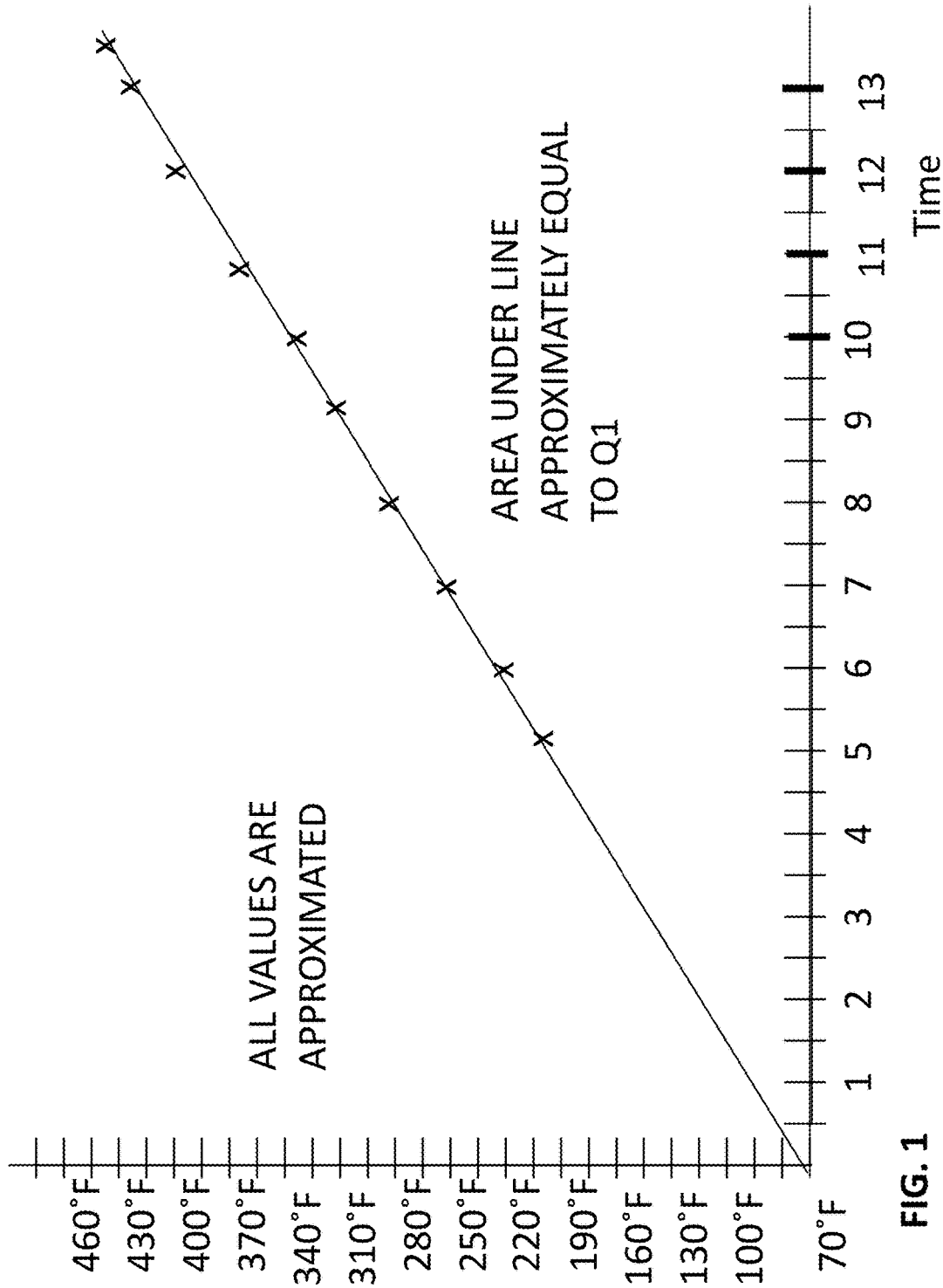
FIG. 1 is a graphical illustration of a plot of time versus temperature for a conventional oven heated over time between room temperature and approximately 450 degrees F. The integral or area under the line is an example of an estimate of the heat transferred (Q1) during the time period.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout the description of the figures.

It will be understood that when an element is referred to as being "connected" or "coupled" to another element, it can be directly connected or coupled to the other element or intervening elements may be present. In contrast, when an element is referred to as being "directly connected or coupled" to another element, there are no intervening elements present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first layer could be termed a second layer, and, similarly, a second layer could be termed a first layer without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing.

FIG. 1 is a diagrammatic illustration of a preferred embodiment.

In the ordinary course of cooking, the oven is preheated to a recommended temperature. The chef or operator then places the food in the oven. A portion of the recommended time is the time (T1) in which the food takes to reach the recommended temperature of the oven. The balance of the time (T2) is the time the food cooks at the recommended temperature. In the case of two items in the oven at the same time, there is no time and temperature monitor for the second food item. This may require separate heating via a second oven. With such a set-up, energy is lost which could be eliminated by warming the food item concurrently with the warming of the item or cooking two items concurrently.

For example, recommended temperatures for foods are based on achieving desired goals, including the killing of bacteria and desired "cooked" result. For example, in the case of the cooked state of a steak, the steak could be rare, medium of well done. A chef or home owner is left to guess at the cooking time to achieve these results.

A preferred embodiment comprises inserting a probe into the steak whereupon the computer monitors the steak's inner temperature. The chef may select the time at the given inner temperature that the food is cooked based upon the results of the computer. A buzzer or sound may be emitted to alert the chef or homeowner to the achievement of the precise cooking time.

A preferred embodiment further comprises cooking two or more different foods at the same time using the probes to sense the food temperatures of a plurality of foods and computing the individual temperatures based on the actual temperature profiles of the individual foods.

An example of the problem solved by a preferred embodiment of the present invention is the cooking of Trident® Wild Alaska Breaded Cod Fillets in a conventional Maytag® gas oven. The cooking instructions are to preheat to 450 degrees and cook for 14 to 17 minutes. The inefficiency occurs in the time required to preheat the oven. As shown approximately in FIG. 1, after 5 minutes the oven temperature was 215° F.

| Time | Temperature |
| --- | --- |
| 6 min. | 240° F. |
| 7 min. | 270° F. |
| 8 min. | 300° F. |
| 9 min. | 330° F. |
| 10 min. | 360° F. |
| 11 min. | 390° F. |
| 12 min. | 415° F.' |
| 13 min. | 435° F. |

Finally at 13 minutes and 30 seconds, the oven temperature of 450° F. was reached. However, time and energy was wasted as the food was not being cooked during this time.

A preferred embodiment of the present invention is directed towards maximizing time and energy by using at least one processor to compute actual cooking times required to cook foods without waiting for the "preheat" time, that is, the time it takes the oven to achieve the cooking temperature in the directions for cooking the food on the food packaging. In the example given above, the actual time spent cooking the food was nearly doubled due to the "preheating" time (i.e. time spent for the oven to reach cooking temperature.

At this point it is best to understand what temperature is necessary to achieve a desired effect in food preparation.

According to http://www.four-h.purdue.edu/food/Cooking%20fish%20fishand%20shellfish%20frame1.htm No turning is required when fish is baked in the oven; the cooking time is short. The coating and high temperature seal in juices and produce a crispy brown crust . . . . Baking for fillets at 350° F. is 20 to 25 min.

Clearly, from the above, the food manufacturer's temperature setting is 100° F. above that posted on the Purdue University site. Extrapolating from the above preheating time measurement, one could have saved approximately 3½ minutes of preheating time by insertion of the fish at 350° F.

According to "Time vs. Temperature—What Changes What? at http://cooking.stackexchange.com/questins/11739/time-vs-temperature-what-changes-what "Many "things" happen in cooking a particular dish. These physical and chemical (even biological) processes require a certain optimal range of temperature (and humidity) and take a certain amount of time to be completed."

Coupled with this is heat transfer is governed by Newton's law (dQ/dt=−hAΔT. Generally speaking, heat transfer may be achieved by thermal conduction, thermal convection, thermal radiation, and transfer of energy by phase changes. Heat conduction is the transfer of energy between objects that are in physical contact. Radiation is the transfer of energy to or from a body by means of the emission or absorption of electromagnetic radiation (such as in a microwave over). Convection is the transfer of energy between an object and its environment, due to fluid motion.

According to Wikipedia, Convection-cooling can sometimes be described by Newton's law of cooling in cases where the heat transfer coefficient is independent or relatively independent of the temperature difference between object and environment . . . . Newton's law, which requires a constant heat transfer coefficient, states that the rate of heat loss of a body is proportional to the difference in temperatures between the body and its surroundings. The rate of heat transfer in such circumstances is derived below:

Newton's cooling law is a solution of the differential equation given by Fourier's law where $$\frac{dQ}{dt} = h \cdot A(T(t) - T_{env}) = -h \cdot A\Delta T(t)$$

Q is the thermal energy in joules h is the heat transfer coefficient (assumed independent of T here) (W/m² K)

A is the surface area of the heat being transferred (m²)

T is the temperature of the object's surface and interior (since these are the same in this approximation)

$T_{env}$ is the temperature of the environment; i.e. the temperature suitably far from the surface $\Delta T(t) = T(t) - T_{env}$ is the time-dependent thermal gradient between environment and object Assuming that the food is initially frozen, the surface temperature of the food will be below 32° F. (which needs to be converted to Kelvin).

When considering cooking temperature, one needs to consider the chemical changes taking place at certain temperatures. For example, when cooking meats, a 150° F. internal temperature is desirable to kill parasites. Cooking at a higher temperature (for less time) has the general effect of burning the outside of the meat. Cooking at a lower temperature for a longer time has the effect of flavor mixing and keeping some meats tender. Accordingly, one must balance the temperature enough to provide an outside crust and a cooked inside.

Using the case of an egg for example, cooking an egg at 100° F. will result in neither the egg yolk or egg white setting; although cooking at 160° F. will result in a hard boiled egg. The egg white and yolk are proteins which when heated to a certain temperature will denaturize, and such changes do not occur at a lower temperature.

According to the EUFIC Review Article "The Why, How and Consequences of Cooking our Food" at http://www.eufic.ord/article/en/expid/cooking-review-eufic/ According to this text, raw foods such as meat, fish and eggs, may harbor food poisoning bacteria that may cause illness in humans. The optimum temperature for the multiplication of most food poisoning bacteria is between 5-63° C. At temperatures over 70° C. most bacteria are killed. According, most cooking methods heating food to over 70° C. (or 158° F. for a carefully calculated time period will prevent many food borne illnesses Another concept in the cooking of food is digestibility, which involves the extraction of vital nutrients that different foods contain. According to "The Why, How and Consequences of Cooking our Food," the enzyme amylase is found in the mouth and intestine and breaks down polysaccharide starch into monomer glucose constituents that are easily digested by the body. Cooking foods containing starch (such as cereal and vegetables) initiates the breakdown of polysaccharide, which assists the action of amylase. Further according to "The Why, How and Consequences of Cooking our Food," when heated fats are modified by the combination of oxygen in the air and the temperature. The smoke points of fat occur when the oil or fat gives off smoke, commonly occurring in the range of 350 to 450° F. (or 177° C. to 232° C.)

A preferred embodiment of the present invention is the computation of food temperatures and cooking times which take into account the chemical and bacterial changes in the food to determine a time and temperature independent of "precooking" temperatures. A preferred embodiment comprises an input of the food package temperatures (commonly based upon a preheating period) and converting this temperature to a one step oven cooking time not involving a preheating period.

For example, in the a case of filets of fish from a package which advises cooking the filets (after preheating to 450° F.) at 450° F. for 14 to 17 minutes, by inserting the filets into the oven immediately, the equivalent cooking is achieved in a shortened amount of time. Included in the cooking time is the time necessary to kill bacteria (heating food to over 70° C. or 158° F. for a carefully calculated time period).

A preferred embodiment utilizes the heat transfer differential equation given by Fourier's law where $$\frac{dQ}{dt} = h \cdot A(T(t) - T_{env}) = -h \cdot A \Delta T(t)$$

Q is the thermal energy in joules
h is the heat transfer coefficient (assumed independent of T here) (W/m² K)
A is the surface area of the heat being transferred (m²)
T is the temperature of the object's surface and interior (since these are the same in this approximation)
$T_{env}$ is the temperature of the environment; i.e. the temperature suitably far from the surface
$\Delta T(t) = T(t) - T_{env}$ is the time-dependent thermal gradient between environment and object Where t is the cooking time and the average temperature is derived by measuring time and temperature changes associated with an oven. For the purposes of FIGS. 5 and 6, the heat transferred was estimated using the change in temperature over unit of time.

For example, FIG. 1 is a graphical illustration of a plot of time versus temperature for a conventional oven heated over time between room temperature and approximately 450 degrees F. The integral or area under the line is an example of an estimate of the heat transferred (Q1) during the time period.

Figure 2:
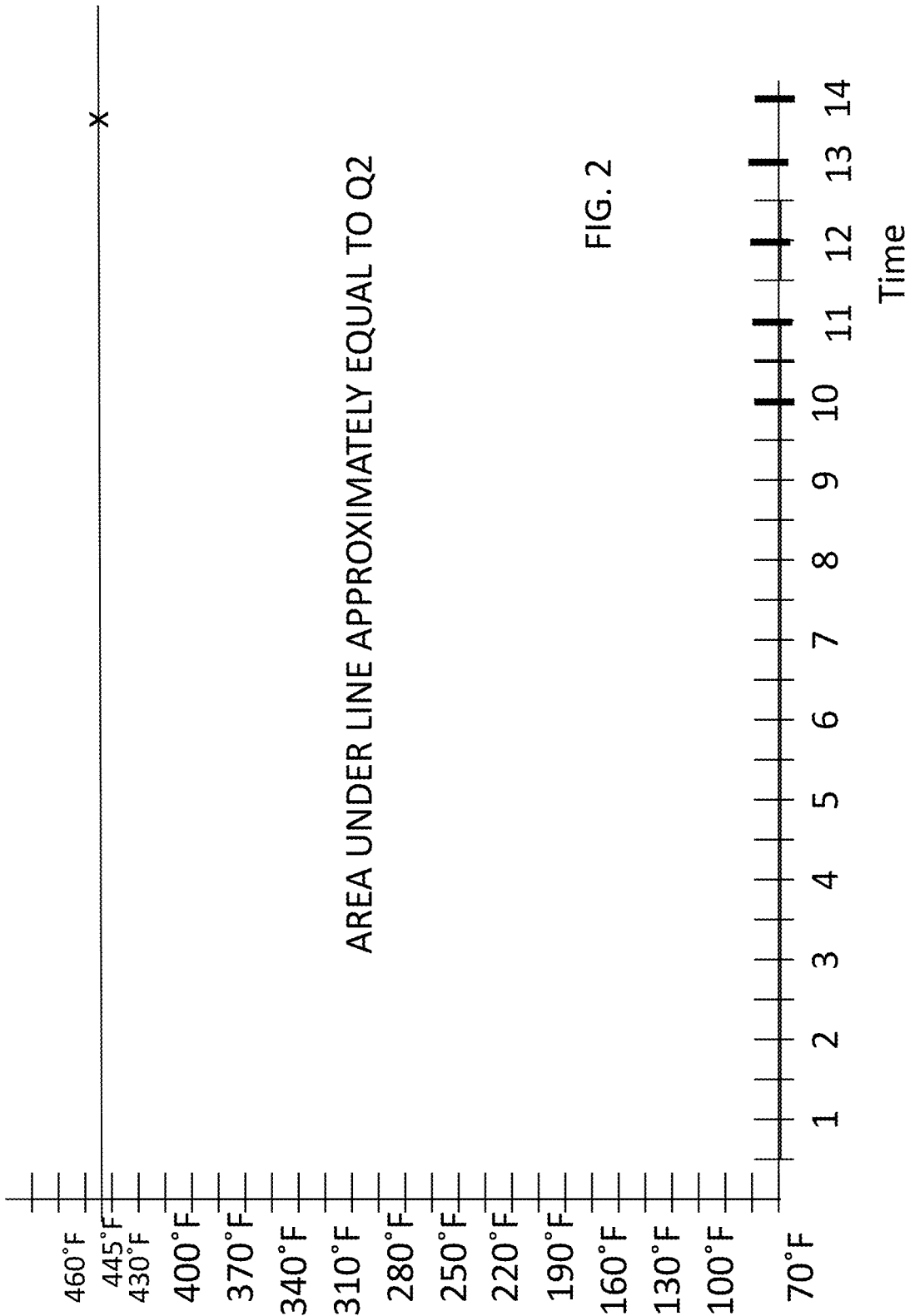
FIG. 2 is a graphical illustration of a plot of time versus temperature for a conventional oven heated at approximately 450 degrees F. The integral or area under the line is an example of an estimate of the heat transferred (Q2) during the time period.

FIG. 2 is a graphical illustration of a plot of time versus temperature for a conventional oven heated at approximately 450 degrees F. The integral or area under the line is an example of an estimate of the heat transferred (Q2) during the time period.

Figure 3:
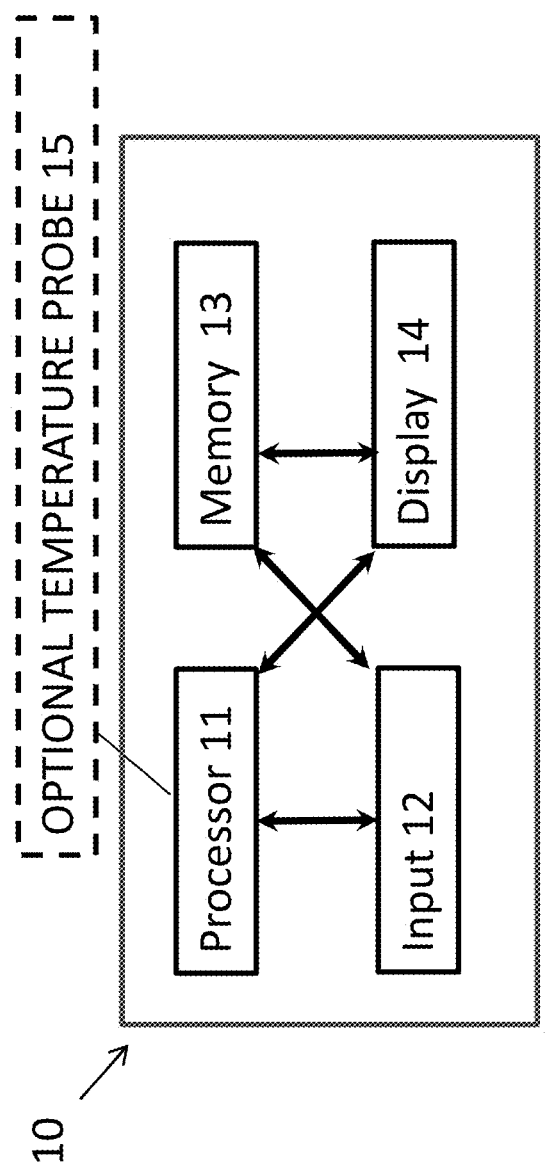
FIG. 3 is a diagrammatic illustration of a preferred embodiment of a preferred embodiment device. Alternately, the preferred embodiment may be a personal assistant device and/or a smart phone.

FIG. 3 is a diagrammatic illustration of a preferred embodiment of a preferred embodiment device. Alternately, the preferred embodiment may be a personal assistant device and/or a smart phone. The device 30 comprises at least one processor 11 operatively connected to a memory 13 and input 12. The device may optionally include a display or sound output 14. Optionally, a temperature probe 15 may be inserted into or near the food item to be cooked in the oven (not shown).

Figure 4:
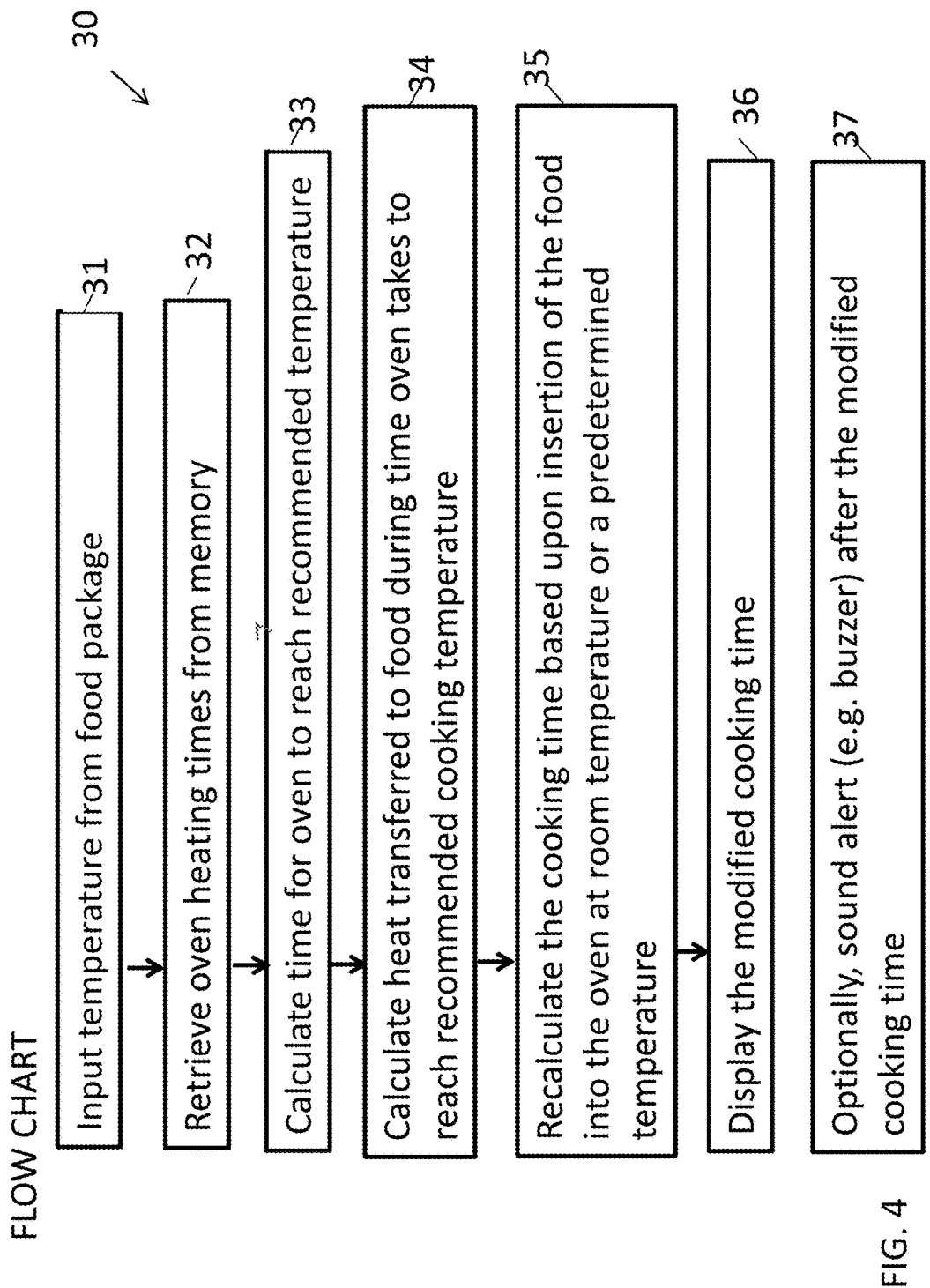
FIG. 4 is a flow chart of a preferred compute program 30 used to practice a preferred embodiment of the present invention.

FIG. 4 is a flow chart of a preferred computer program 30 used to practice a preferred embodiment of the present invention. As shown in FIG. 4, Box 31 represents the inputted of the suggested temperature from the food package and/or cook book. Optionally, the temperature may be associated with an input from the user, such as fish fillets. Box 32 represents the retrieval of heating times from memory 13. This correlates to the time required by the oven to be heated to a predetermined temperature (similar in nature to those temperatures plotted in FIG. 1. Box 33 represents the calculation of time for the oven to reach the recommended or suggested cooking temperature obtained from the product box or bag, a cook book or memory 13.

Box 34 represents the calculation of the heat transferred to food during time oven taken to reach recommended cooking temperature. Box 35 represents the recalculation of the cooking time based upon insertion of the food into the oven at room temperature or a predetermined temperature. Box 35 is further developed in FIG. 5.

Figure 5:
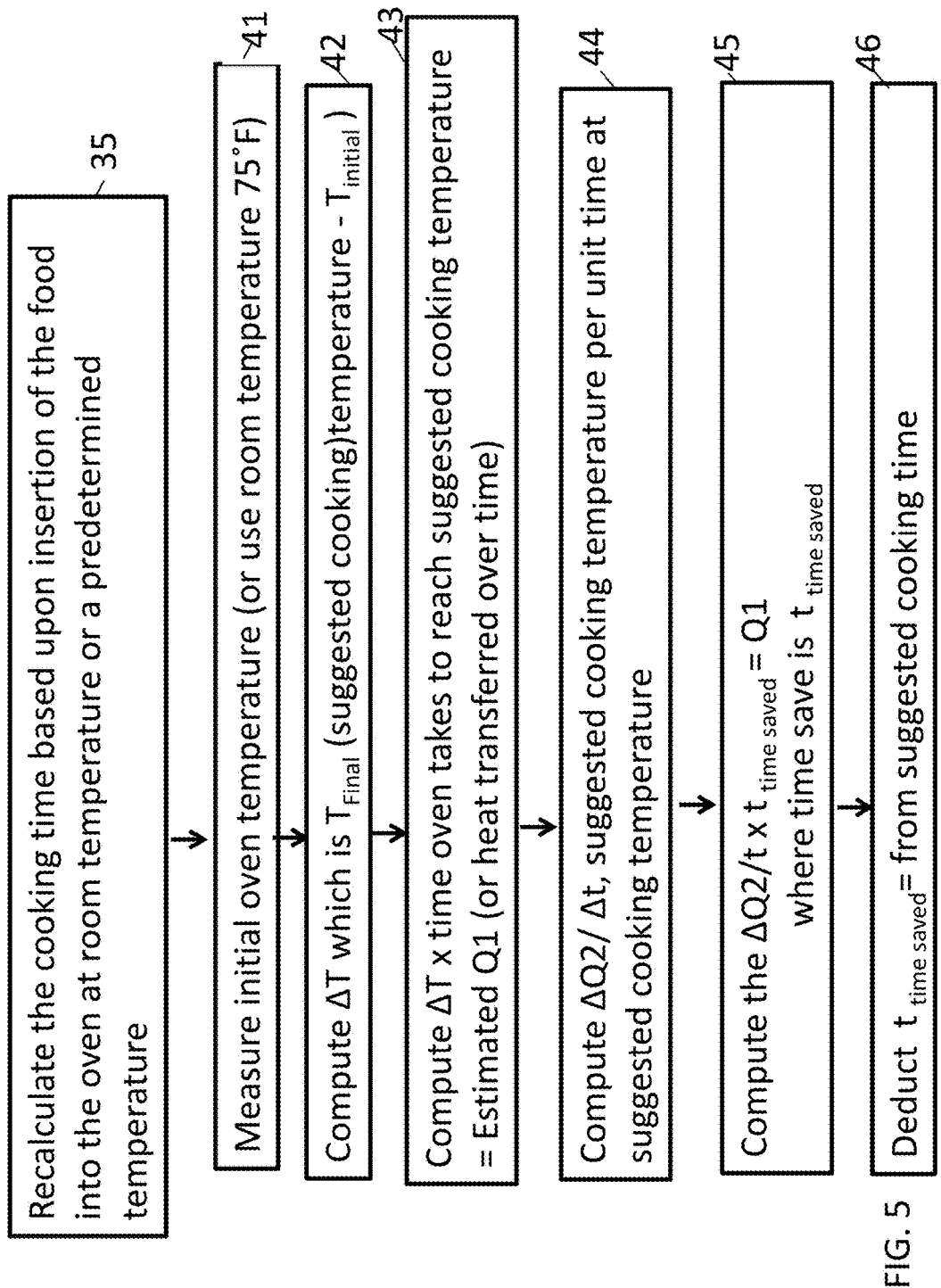
FIG. 5 is a flow chart of a preferred embodiment developed from the step 35 of FIG. 4.

Box 36 represents the optional display of the modified cooking time. Optionally, a sound alert, such as for example, a buzzer after the modified cooking time Referring now to FIG. 5, shown is box 35 reproduced from FIG. 4 representing the recalculation of the cooking time based upon insertion of the food into the oven at room temperature or a predetermined temperature. Box 41 represented the measurement of initial oven temperature (as an alternative room temperature, e.g. 75° F., could be used). Box 42 represents the computation of $\Delta T$ which is $T_{Final}$ (suggested cooking) temperature$-T_{initial}$).

Box 43 represents the computation of $\Delta T \times$time oven takes to reach suggested cooking temperature=Estimated Q1 (or heat transferred over time). Box 44 represents the computation of $\Delta Q2/\Delta t$, suggested cooking temperature per unit time at suggested cooking temperature. Box 45 represents the computation of the computation of $\Delta Q2/t \times t_{time\ saved}=Q1$, where time save is $t_{time\ saved}$.

As shown in the figures, estimates of the heat transferred during the preheating period (where the heat transferred is referred to as Q1), is used to determine what portion of the suggested cooking time (as referenced at the package, carton or cook book) is no longer required to properly heat the food being cooked. This computation is represented by Box 46

FIG. 6 is a more detailed flow chart of a preferred method of estimating the heat transferred during the "warm-up"

period illustrated for example in FIG. 1, which is used to determine a time (and energy) savings. FIG. 6 is a flow chart of steps to determine time saved from the heat transferred per unit time at the suggested temperature as compared to the heat transferred during the time period in which the oven is heated from initial temperature to suggested temperature.

Box 51 is denoted $$\text{Compute } \Delta T \times t_1(\text{time oven takes to reach suggested cooking temperature}) = Q1$$

Box 52 represents the step of using estimated Q1 (or heat transferred over time during preheating time) compute the amount of time which can be subtracted ($t_{time\ saved}$) from the suggested heating time at the recommended temperature.

Box 53 represents using $\Delta Q2/t \times t_{time\ saved} = Q1$; calculate time saved As used herein the terminology "processor" or "controller" as used herein may be a microprocessor, computer, programmable controller, programmable chip, multiprocessor, personal computer, CPU, coprocessor, central processor, or the like Embodiments of the present invention are described herein are schematic illustrations of idealized embodiments of the present invention. As such, variations from the shapes of the illustrations as a result, for example, of manufacturing techniques and/or tolerances, are to be expected. The embodiments of the present invention should not be construed as limited to the particular shapes of displays illustrated herein but are to include deviations in shapes that result, for example, from manufacturing. The regions (or display areas) illustrated in the figures are schematic in nature and their shapes are not intended to illustrate the precise shape of a region and are not intended to limit the scope of the present invention.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

The invention claimed is:

1. A cooking device for cooking food comprising:
an oven;
a sensor for sensing cooking temperatures in the oven;
at least one processor for computing time saved for heat transferred during a period of time oven takes to reach a suggested cooking temperature and
for estimating a reduced cooking time;
a memory operatively connected to the at least one processor;
an input configured for inputting a suggested cooking time and time oven takes to achieve a series of cooking temperatures; the at least one processor operating to estimate heat transferred to a food during a time period that the oven takes to reach a suggested cooking temperature;
the at least one processor operating to compute the amount of heat transferred to the food per unit time at the suggested cooking temperature, and the at least one processor operating to calculate a modified cooking time needed to cook the food based upon insertion of food into the oven at an initial temperature other than the suggested cooking temperature by estimating the heat transferred during a period of time an oven takes to reach the suggested cooking temperature and adding this amount to the estimated heat transferred by the oven at the suggested cooking temperature per unit time.

2. The device of claim 1 wherein the sensor comprises a temperature probe for monitoring temperature within the oven and wherein an alarm sounds when the food is deemed properly cooked.

3. The device of claim 1 wherein the initial temperature is the temperature of a room wherein the oven is situated.

4. The device of claim 1, wherein the sensor comprises a temperature probe for monitoring the temperature within the oven and wherein temperature of the oven is inputted during period in which the food is to be cooked and an alarm is sounded when the food is finished cooking at the expiration of the cooking time.

5. The device of claim 1 further comprising a first time and temperature override wherein the device computes a temperature and time required to kill bacteria in the food and wherein the modified cooking time includes a duration of cooking at a temperature required to kill bacteria in the food to ensure food safety.

6. The device of claim 1 further including a second a time and temperature override operative to impart a crust or flavoring to the food being cooked.

7. The device of claim 1 wherein the oven is a conventional oven and the at least one processor computes minimum cooking times required for the conventional oven to cook food without waiting for the conventional oven to reach the suggested cooking temperature.

8. The device of claim 1 wherein the device is one of a hand held personal computing device or smart phone and the device is programmed to be used with a conventional oven to determine the minimum cooking time for food inserted into the conventional oven at room temperature based upon the calculation of the heat transferred during the time the oven takes to reach the suggested cooking temperature.

9. A device for computing time saved for heat transferred during a period of time an oven takes to reach a suggested cooking temperature comprising:
at least one processor for estimating a reduced cooking time;
a temperature sensor operatively connected to the at least one processor;
a memory operatively connected to the at least one processor;
an input configured for inputting a suggested cooking time and the amount of time an oven takes to achieve a series of cooking temperatures; the at least one processor operating to estimate heat transferred to a food during a time period that the oven takes to reach a suggested cooking temperature;
the at least one processor operating to compute the amount of heat transferred to the food per unit time at the suggested cooking temperature, and the at least one processor operating to calculate a reduced cooking time needed to cook the food based upon insertion of food into the oven at an initial temperature; wherein a first heat transfer estimate is obtained based upon time it takes for the oven to reach the suggested cooking temperature multiplied by the heat transferred per unit time the oven takes to reach the suggested cooking temperature and wherein a second heat transfer estimate is based upon heat transferred per unit time multiplied by the suggested cooking time; and wherein the reduced cooking time is calculated based upon subtracting the first heat transfer estimate from the second transfer estimate.

10. The device of claim 9 wherein the device comprises one of a hand held personal computing device or smart phone and the device is programmed to be used with a conventional oven to allow insertion of food into the conventional oven without the need to wait while the oven is heated to the predetermined cooking temperature and wherein the modified cooking time is displayed based upon insertion of the food into the oven at room temperature and wherein the device is programmed to be used with a conventional oven to time insertion of food into a conventional oven for calculation of the heat transferred during the preheating time and wherein the modified cooking time is displayed based upon insertion of food at the room temperature so that the user does not need to wait until the recommended cooking temperature is reached in the oven before insertion of food into a conventional oven and wherein the food is cooked in the oven for a period of time greater that the suggested cooking time to compensate for the reduced heat transfer while the oven is heated to the suggested cooking temperature.

11. The device of claim 9 wherein the reduced cooking time is computed using the second heat transfer estimate and the heat transferred per unit time at the suggested cooking temperature.

12. A method for computing time saved for heat transferred during a period of time an oven takes to reach a suggested cooking temperature comprising:
inputting a suggested cooking temperature from the food package and/or cook book;
inputting the suggested cooking time;
retrieving from memory times spent for an oven to be heated from a first temperature to a series of predetermined cooking temperatures;
calculating the time needed for the oven to reach the predetermined cooking temperature;
estimating the heat transferred to food during the time oven takes to reach predetermined cooking temperature;
calculating a modified cooking time based upon the heat transferred to the food during the time period in which the oven is heated to the suggested predetermined cooking temperature following insertion of the food into the oven at a first temperature;
cooking the food for the modified cooking time.

13. The method of claim 12 wherein the modified cooking time is based upon insertion of the food into the oven at room temperature and wherein the device is one of a hand held personal computing device or smart phone and the device is programmed to be used with a conventional oven to time insertion of food into a conventional oven for calculation of the heat transferred during the preheating time and wherein the modified cooking time is displayed based upon insertion of food at the room temperature so that the user does not need to wait until the recommended cooking temperature is reached in the oven before insertion of food into a conventional oven and wherein the food is cooked in the oven for a period of time greater that the suggested cooking time to compensate for the reduced heat transfer while the oven is heated to the suggested cooking temperature.

14. The method of claim 13 wherein upon the expiration of the cooking time based upon insertion of the food into the oven at room temperature, an alarm is sounded.

15. The method of claim 12 wherein the predetermined temperature is obtained from the product box or bag, a cook book or memory.

16. A method for computing time saved for heat transferred during a period of time an oven takes to reach a suggested cooking temperature comprising:
inputting a predetermined cooking temperature from the food package and/or cook book;
retrieving from memory times spent for an oven to be heated from a first temperature to a series of predetermined cooking temperatures;
calculating the time needed for the oven to reach the predetermined cooking temperature;
estimating the heat transferred to food during the time oven takes to reach predetermined cooking temperature;
calculating the cooking time based upon insertion of the food into the oven at room temperature;
wherein the step of estimating the heat transferred to the food comprises estimating a first heat transfer estimate based upon the time it takes for the oven to reach the suggested cooking temperature multiplied by the heat transferred per unit time during which the oven takes to reach the suggested cooking temperature and a second heat transfer estimate based upon the suggested cooking time multiplied by the heat transferred per unit time; and wherein the step of calculating the cooking time comprises calculating a modified cooking time based upon subtracting the first heat transfer estimate from the second transfer estimate.

17. The method of claim 16, wherein the modified cooking time is computed using the second heat transfer estimate and the heat transferred per unit time at the suggested cooking temperature.

18. A device for computing heat transferred during a period of time an oven takes to reach a predetermined cooking temperature comprising:
at least one processor for estimating a first cooking time;
a memory operatively connected to the at least one processor;
an input configured for inputting the first cooking time and amounts of time an oven takes to achieve a series of cooking temperatures; the at least one processor operating to estimate the heat transferred to the food during the time period that the oven takes to reach the predetermined cooking temperature;
the at least one processor operating to compute the amount of heat transferred to the food per unit time at the predetermined cooking temperature, and the at least one processor operating to calculate a modified cooking time needed to cook food based upon insertion of food into the oven at a temperature other than the predetermined cooking temperature.

19. The device of claim 18 wherein the device is one of a hand held personal computing device or smart phone and the device is programmed to be used with a conventional oven to time insertion of food into a conventional oven for calculation of the heat transferred while the oven is heated to the predetermined cooking temperature and wherein the modified cooking time is displayed based upon insertion of food at the room temperature so that the user does not need to wait until the predetermined cooking temperature is reached in the oven before insertion of food into a conventional oven and wherein the food is cooked in the oven for a period of time greater that the suggested cooking time to compensate for the reduced heat transfer while the oven is heated to the predetermined cooking temperature.

20. The device of claim 18 further including a temperature probe for monitoring the temperature within the oven.

21. The device of claim 18 wherein the temperature other than the predetermined cooking temperature is the temperature of the room wherein the oven is situated and wherein a standard oven is utilized without increased heat flow.

22. The device of claim 18 wherein a first heat transfer estimate is obtained based upon the time it takes for the oven to reach the predetermined cooking temperature multiplied by the heat transferred per unit time the oven takes to reach the predetermined cooking temperature and wherein a second heat transfer estimate is based upon the suggested cooking time multiplied by the heat transferred per unit time; and wherein the modified time is calculated based upon subtracting the first heat transfer estimate from the second transfer estimate.

23. A method for recalculating the cooking time for a food item using a one of a hand held personal computing device or smart phone programmed to be used with a conventional oven to time insertion of food into a conventional oven for calculation of the heat transferred while the oven is heated to the suggested cooking temperature, the modified cooking time being displayed based upon insertion of food at the room temperature so that the user does not need to wait until the predetermined cooking temperature is reached in the oven before insertion of food into a conventional oven and wherein the food is cooked in the oven for a period of time greater that the suggested cooking time to compensate for the reduced heat transfer while the oven is heated to the predetermined cooking temperature; the method comprising the following steps not necessarily in the following order:

measuring one of the initial oven temperature or room temperature;

computing the amount of heat transferred to a food item while the oven is being heated to the suggested cooking temperature;

computing the amount of heat transferred based upon the suggested cooking temperature and suggested cooking time;

determining the amount of heat transferred to the food during the time the oven takes to reach the suggested cooking temperature;

computing a modified cooking time greater than the suggested cooking time which takes into consideration the amount of heat transferred to the food during the time the oven takes to reach the suggested cooking temperature; and displaying the time on the hand held personal computing device or smart phone.

24. The method of claim 23 wherein the amount of heat transferred to the food during the time the oven takes to reach the suggested cooking temperature determined using the differential equation $$\frac{dQ}{dt} = h \cdot A(T(t) - T_{env}) = -h \cdot A \Delta T(t)$$

where Q is the thermal energy in joules; h is the heat transfer coefficient, A is the surface area of the heat being transferred ($m^2$), T is the temperature; $T_{env}$ is the temperature of the environment; and $\Delta T(t) = T(t) - T_{env}$ is the time-dependent thermal gradient between environment and food.

* * * * *